(12) United States Patent
Shan et al.

(10) Patent No.: US 11,651,766 B2
(45) Date of Patent: May 16, 2023

(54) ULTRA-LOW-POWER SPEECH FEATURE EXTRACTION CIRCUIT BASED ON NON-OVERLAPPING FRAMING AND SERIAL FFT

(71) Applicant: SOUTHEAST UNIVERSITY, Jiangsu (CN)

(72) Inventors: Weiwei Shan, Jiangsu (CN); Lixuan Zhu, Jiangsu (CN); Jun Yang, Jiangsu (CN); Longxing Shi, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 91 days.

(21) Appl. No.: 17/181,908

(22) Filed: Feb. 22, 2021

(65) Prior Publication Data
US 2022/0189459 A1    Jun. 16, 2022

(30) Foreign Application Priority Data

Dec. 16, 2020    (CN) .......................... 202011488049.8

(51) Int. Cl.
G10L 15/02 (2006.01)
G06F 17/14 (2006.01)
G10L 25/24 (2013.01)

(52) U.S. Cl.
CPC ............ G10L 15/02 (2013.01); G06F 17/142 (2013.01); G10L 25/24 (2013.01)

(58) Field of Classification Search
CPC ........ G10L 15/02; G10L 25/24; G06F 17/142
See application file for complete search history.

(56) References Cited

U.S. PATENT DOCUMENTS

2021/0065689 A1 *    3/2021    Guarneri ................. G10L 15/16

OTHER PUBLICATIONS

Liu et al., "A 22nm, 10.8 μ W/15.1 μ W Dual Computing Modes High Power-Performance-Area Efficiency Domained Background Noise Aware Keyword-Spotting Processor," in IEEE Transactions on Circuits and Systems I: Regular Papers, vol. 67, No. 12, pp. 4733-4746, Dec. 2020 (first pub. date Jun. 2, 2020). (Year: 2020).*

(Continued)

*Primary Examiner* — Michelle M Koeth
(74) *Attorney, Agent, or Firm* — Muncy, Geissler, Olds & Lowe, P.C.

(57) ABSTRACT

The present invention discloses an ultra-low-power speech feature extraction circuit based on non-overlapping framing and serial fast Fourier transform (FFT), and belongs to the technical field of computation, calculation or counting. The circuit is oriented to the field of intelligence, and is integrally composed of a pre-process module, a windowing module, a Fourier transform module, a Mel filtering module, an adjacent frame merging module, a discrete cosine transform (DCT) module and other modules by optimizing the architecture of a Mel-frequency Cepstral Coefficients (MFCC) algorithm. Large-scale storage caused by framing is avoided in a non-overlapping framing mode, storage contained in the MFCC algorithm is further reduced, and the circuit area and the power consumption are greatly reduced. An FFT algorithm in the feature extraction circuit adopts a serial pipeline mode to process data, makes full use of the characteristics of serial inflow of audio data, and further reduces the storage area and operations of the circuit.

4 Claims, 5 Drawing Sheets

(56) References Cited

OTHER PUBLICATIONS

Liu et al., "EERA-KWS: A 163 TOPS/W Always-on Keyword Spotting Accelerator in 28nm CMOS Using Binary Weight Network and Precision Self-Adaptive Approximate Computing," in IEEE Access, vol. 7, pp. 82453-82465, Jun. 21, 2019, doi: 10.1109/Access. 2019.2924340. (Year: 2019).*

Saambhavi et al., "Design of feature extraction circuit for speech recognition applications," TENCON 2012 IEEE Region 10 Conference, 2012, pp. 1-5, doi: 10.1109/TENCON.2012.6412215. (Year: 2012).*

He et al., "A new approach to pipeline FFT processor," Proceedings of International Conference on Parallel Processing, 1996, pp. 766-770, doi: 10.1109/IPPS.1996.508145. (Year: 1996).*

Shan et al., "A 510-nW Wake-Up Keyword-Spotting Chip Using Serial-FFT-Based MFCC and Binarized Depthwise Separable CNN in 28-nm CMOS," in IEEE Journal of Solid-State Circuits, vol. 56, No. 1, pp. 151-164, Jan. 2021 (IEEE earliest pub date given as Oct. 10, 2020), doi: 10.1109/JSSC.2020.3029097. (Year: 2020).*

Vu et al., "Implementation of the MFCC front-end for low-cost speech recognition systems," Proceedings of 2010 IEEE International Symposium on Circuits and Systems, 2010, pp. 2334-2337, doi: 10.1109/ISCAS.2010.5537242. (Year: 2010).*

Hasan et al., "Preprocessing of Continuous Bengali Speech for Feature Extraction," 2020 11th International Conference on Computing, Communication and Networking Technologies (ICCCNT), 2020, pp. 1-4, doi: 10.1109/ICCCNT49239.2020.9225469. (Year: 2020).*

Zhang et al., "The fixed-point optimization of mel frequency cepstrum coefficients for speech recognition," Proceedings of 2011 6th International Forum on Strategic Technology, 2011, pp. 1172-1175, doi: 10.1109/IFOST.2011.6021229. (Year: 2011).*

Singh et al., "An Approach to Extract Feature using MFCC," IOSR Journal of Engineering (IOSRJEN), vol. 04, Issue 08 (Aug. 2014), pp. 21-25. (Year: 2014).*

Shan, Weiwei, et al., "14.1 A 510nW0.41V Low-Memory Low-Computation Keyword-Spotting Chip Using Serial FFT-Based MFFCC and Binarized Depthwise Separable Convolutional Neural Network in 28 nm CMOS," 2020 IEEE International Solid-State Circuits Converence, Session 14, Low-Power Machine Learning, Digest of Technical Papers, Feb. 18, 2020, pp. 230-231.

* cited by examiner

ULTRA-LOW-POWER SPEECH FEATURE EXTRACTION CIRCUIT BASED ON NON-OVERLAPPING FRAMING AND SERIAL FFT

BACKGROUND

Technical Field

The present invention discloses an ultra-low-power speech feature extraction circuit based on non-overlapping framing and serial fast Fourier transform (FFT), relates to signal processing and integrated circuit design technologies, and belongs to the technical field of computation, calculation or counting.

Related Art

With the rapid development of computer technology, human-computer interaction has become a hot research direction, and speech is an important means of information communication. At present, the speech recognition technology has been widely used, for example, Siri of iPhone, an intelligent sound box, a robot, a vehicle system, etc. The speech recognition technology is an entrance of human-computer interaction, and speech wake-up is an interface of a complex system. How to efficiently and accurately respond to users' instructions has become the most important goal of the human-computer interaction technology. In battery-powered intelligent devices, the resource-constrained characteristics determine that the ultra-low power consumption has become an urgent problem to be solved. The process of speech wake-up consists of two phases: feature extraction of audio signals and feature recognition of key words. For a speech wake-up system, good speed features can greatly improve the final recognition accuracy of the system, so the design of the speech feature extraction circuit is a key point of the whole system design.

At present, the commonly used speech feature extraction algorithm is Mel-frequency cepstral coefficients (MFCC). MFCC converts time-domain signals into frequency-domain signals through FFT, and then performs Mel filtering on the frequency-domain signals. The essence of Mel filtering is to make final features as close as possible to human physiological sense (because human perception of sound is non-linear). Then a natural logarithm operation is performed on a Mel filtering result, and then discrete cosine transform (DCT) is performed on a logarithm operation result to obtain a series of features of the sound. The conventional MFCC algorithm has poor adaptability corresponding to hardware, and the FFT operation process and a large amount of multiplication and addition operations and storage area required by the Mel filtering operation increase the implementation difficulty and cost of the hardware. In order to overcome the defects of the conventional MFCC algorithm, an optimized low-power MFCC speech feature extraction circuit greatly reduces the operation and storage amounts of the speech feature extraction circuit through serial FFT, architecture optimization of the Mel filtering algorithm and a multiplication and addition mode of a pre-process module, but the optimized speech feature extraction circuit has overlapping data after processing two adjacent frames of data by framing and windowing, and the amount of the overlapping data is usually half of the number of data points of one frame. The capacity of a memory for storing overlapping data is related to the number of data points of one frame and the data precision, and the defects of large operation amount and large-area storage requirement still exist. The present application aims to optimize a framing and windowing operation module in a speech feature extraction circuit so as to avoid framing operations in the whole feature extraction process and then achieve the objective of further reducing the operation amount, the storage area and the hardware power consumption.

SUMMARY

In view of the defects of the background, an objective of the present invention is to provide an ultra-low-power speech feature extraction circuit based on non-overlapping framing and serial FFT, which simplifies most of storage contained in a circuit by utilizing a non-overlapping framing windowing operation and processes input data by adopting a serial FFT algorithm, and greatly reduces the area and power consumption of the circuit under the condition of adapting to the characteristics of a serial input data stream, so that the power consumption of a speech feature extraction circuit is ultra-low, thereby solving the technical problems of high power consumption and large storage amount of the speech feature extraction algorithm on hardware.

In order to achieve the objective of the present invention, the following technical solution is adopted in the present invention.

The ultra-low-power speech feature extraction circuit based on non-overlapping framing and serial FFT includes: a pre-process module, a windowing module, an FFT module, a Mel filtering module, an adjacent frame merging module, and a logarithm and DCT module.

The pre-process module has the same function as a high-pass filter. The module ensures a signal-to-noise ratio of signals in a frequency spectrum. Specifically, a speech sequence is serially input into the pre-process module, and input data is subtracted from a result obtained after adjacent previous data is multiplied by a coefficient to obtain a pre-emphasized speech signal.

The windowing module has the function of taking data oft (t is a decimal number of 10 to 20 usually) milliseconds as a data length of a Hamming window, the number of data points of t milliseconds (the number of data points is a frame length multiplied by a sampling rate) is T (T is an integer, and in order to meet the next FFT module, T is $2^N$ usually), and the data precision is A bits (A is an integer greater than 1). The input data sequentially flows into the windowing module within a period T and is sequentially output after being multiplied by T Hamming window function values stored in a read-only memory, so that the output of the module may be obtained.

The FFT module has the function of transforming a frame of time domain signal with a length T into a frequency domain signal. The FFT module is composed of N/2 (N is an exponential term of 2 in T) radix-$2^2$ single-path delay feedback (Radix-$2^2$SDF) units. Each Radix-$2^2$SDF unit includes two butterfly operations and one product operation with a twiddle factor. The butterfly operation is to perform cross addition and subtraction on two input real numbers to obtain a new group of real numbers. The twiddle factor is pre-stored in the read-only memory. The data output by the windowing module flows into the FFT module in a natural sequence in series, and after N/2 Radix-$2^2$SDF unit operations are carried out, final data is sequentially output in the order of bit permutation (bits are reversed into a high bit and a symmetrical low bit for reversal).

The Mel filtering module has the function of performing a Mel filtering operation on a frequency domain signal of each frame. The operation specifically includes: firstly, performing a square addition operation on real-part and imaginary-part data output by the FFT module to obtain an energy value of a frequency domain; then, multiplying the energy value with a function value of an M-order Mel filtering group (M is an integer of 20 to 40 usually) pre-stored in a static random access memory, and accumulating values of the multiplied whole-frame signal; and finally obtaining M Mel values per frame. In the circuit design, input data of a Mel filter group needs to be subjected to odd-even separation processing, the data flows sequentially, and odd index data and even index data are alternately operated in two accumulators. Since the bandwidths of the adjacent filters overlap, when data after modular operation is completed is input one by one, two filters may be simultaneously corresponded. Therefore two multiplication and accumulation operations need to be performed simultaneously. On the other hand, there is no overlap in an odd-level filter and an even-level filter, and each data is only one value in the corresponding odd-level or even-level filter, so that multiplication and accumulation can be respectively performed on data input point by point only by separating the odd and even filters.

The adjacent frame merging module has the function of adding data corresponding to M-order Mel filtering results of a current frame and a next frame (i.e. adding a first Mel filtering result of the current frame and a first Mel filtering result of the next frame and so on until the $M^{th}$ Mel filtering result of the current frame and the $M^{th}$ Mel filtering result of the next frame are added) to obtain a new group of M-order Mel filtering results.

The logarithm and DCT module has the function of compressing and representing Mel data output by the adjacent frame merging module. Firstly, logarithm values with the base of 2 for M Mel values are taken in a lookup table (looking up corresponding logarithm values by searching for a location where the highest bit '1' appears in input data bits) manner, and then DCT is performed. The specific implementation of DCT is that the input data is multiplied by cosine coefficients and then accumulated and calculated, the cosine coefficients are stored in the read-only memory, and an L-order DCT result (L is an integer, usually smaller than M) is finally output, the result being a feature value output by the circuit.

As a further optimization scheme of a low-power MFCC speech feature extraction circuit based on improved serial FFT, the whole architecture adopts an architecture of eliminating framing of overlapping step lengths and adjacent merging after Mel filtering. Compared with an MFCC architecture including a parallel FFT algorithm, the algorithm reduces the circuit area and the power consumption at the expense of certain throughput and speed. Compared with an algorithm architecture including serial FFT, the algorithm reduces the amount of FFT operation data by half, reduces the register storage amount of a large amount of process data, and further saves the operation amount and the storage amount.

According to a further optimization scheme of a low-power MFCC speech feature extraction circuit based on improved serial FFT, in the pre-process module, an original formula is replaced by the following optimized formula. $data_{in}$ and $data_{out}$ respectively represent input data and output data of this operation, and k represents the location of the data, starting from 1:

$$data_{out}[k] = \begin{cases} data_{in}[k] & k = 1 \\ data_{in}[k] - u*data_{in}[k-1] & k > 1 \end{cases} u \text{ is 0.95 usually (original formula)}$$

$$data_{out}[k] =$$
$$data_{in}[k] - data_{in}[k-1] + data_{in}[k-1] \gg 4 \text{ (optimized formula)}$$

Finally, a multiplication and addition operation on the original mathematical formula is optimized into a shift addition operation, and the extra power consumption and the storage amount of a system on chip when the multiplication operation is implemented are reduced.

As a further optimization scheme of a low-power MFCC speech feature extraction circuit based on improved serial FFT, a pipeline serial FFT algorithm is used to realize Fourier transform. The specific process includes the following steps.

In the first step, firstly, a first butterfly operation (BF1) portion in a first Radix-$2^2$SDF operation unit contains a memory with a size of T/2*A bits, a frame of T data is input, the first T/2 data is stored in a memory, the last T/2 data and the first T/2 data are then subjected to a first butterfly operation to obtain two groups of data with a length of T/2, the last T/2 data is returned to be stored in the memory, the first T/2 data is continuously subjected to a second butterfly operation (BF2), and after the second butterfly operation for the first T/2 data is completed, the second butterfly operation is performed on the last T/2 data stored in the memory.

In the second step, a BF2 portion in the first Radix-$2^2$SDF operation unit contains a memory with a size of T/4*A bits, among T/2 data output by the first portion, T/4 data is firstly stored in the memory, similar to the BF1 portion, next T/4 data and the T/4 data in the memory are subjected to BF2, the last T/4 data is returned to be stored, and the first T/4 data is output. The output data is multiplied by its corresponding twiddle factor, the value of the twiddle factor existing in the memory with a size of T/4*A bits. Twiddle factor product units in all the Radix-$2^2$SDF units may call the values in the same memory.

In the third step, flowing of serial data into the next Radix-$2^2$SDF unit still adopts the above operation, but a memory size corresponding to a butterfly operation module in the Radix-$2^2$SDF unit is successively halved. Finally until the size of a memory unit of BF1 in the $N/2^{th}$ Radix-$2^2$SDF unit is 2*A bits, BF2 will directly output a complex result of the FFT module, and finally the data will flow out in the order of bit permutation. Since the entire frame of data is multiplied and summed after Mel filtering, the order does not affect the result and the module will not adjust the order, thus saving the hardware consumption of a control logic portion.

As a further optimization scheme of a low-power MFCC speech feature extraction circuit based on improved serial FFT, in the logarithm module, a logarithm operation is implemented in a lookup table manner. The logarithm operation may be carried out without using a conventional coordinate twiddle digital computer (CORDIC), but by searching for a location where the highest bit '1' of input data appears so as to find corresponding logarithm values.

By adopting the technical solution, the present invention has the following beneficial effects: according to the ultra-low-power speech feature extraction circuit based on non-overlapping framing and serial FFT of the present invention, an MFCC algorithm can be implemented on a circuit, and feature values of audio can be effectively extracted.

(1) Compared with a conventional MFCC circuit based on universal serial FFT, the present invention optimizes a conventional framing windowing algorithm architecture, discards a framing operation containing overlapping parts, saves the required large storage amount, and reduces a data length of an FFT operation by half as compared with the conventional serial FFT. Therefore, the area, the storage amount and the computation amount of the present invention are greatly reduced, and the power consumption is ultra-low.

(2) By utilizing FFT implemented in a serial mode, the storage amount is reduced to 1/N of FFT implemented in a parallel mode (N is an exponential term of T, T is the number of points of one frame, i.e. the input data amount of one frame of FFT, $2^N$ usually), and the computation amount is also greatly reduced.

(3) By utilizing an optimized logarithm mode of a lookup table, the complexity of a logarithm operation is reduced, and the power consumption is reduced.

(4) An approximate operation of a multiplication operation in the pre-process module is utilized, the multiplication operation is replaced with a shift operation, and the power consumption of the operation is reduced.

DETAILED DESCRIPTION

Hereinafter, the technical solution of the present invention will be described in detail with reference to the accompanying drawings. A frame length of 128 points, 20-order Mel values and 10-order DCT values (T=128, M=20, L=10) are taken as examples to illustrate specific implementations of the present invention, but the scope of the present invention is not limited to this embodiment.

Figure 1:
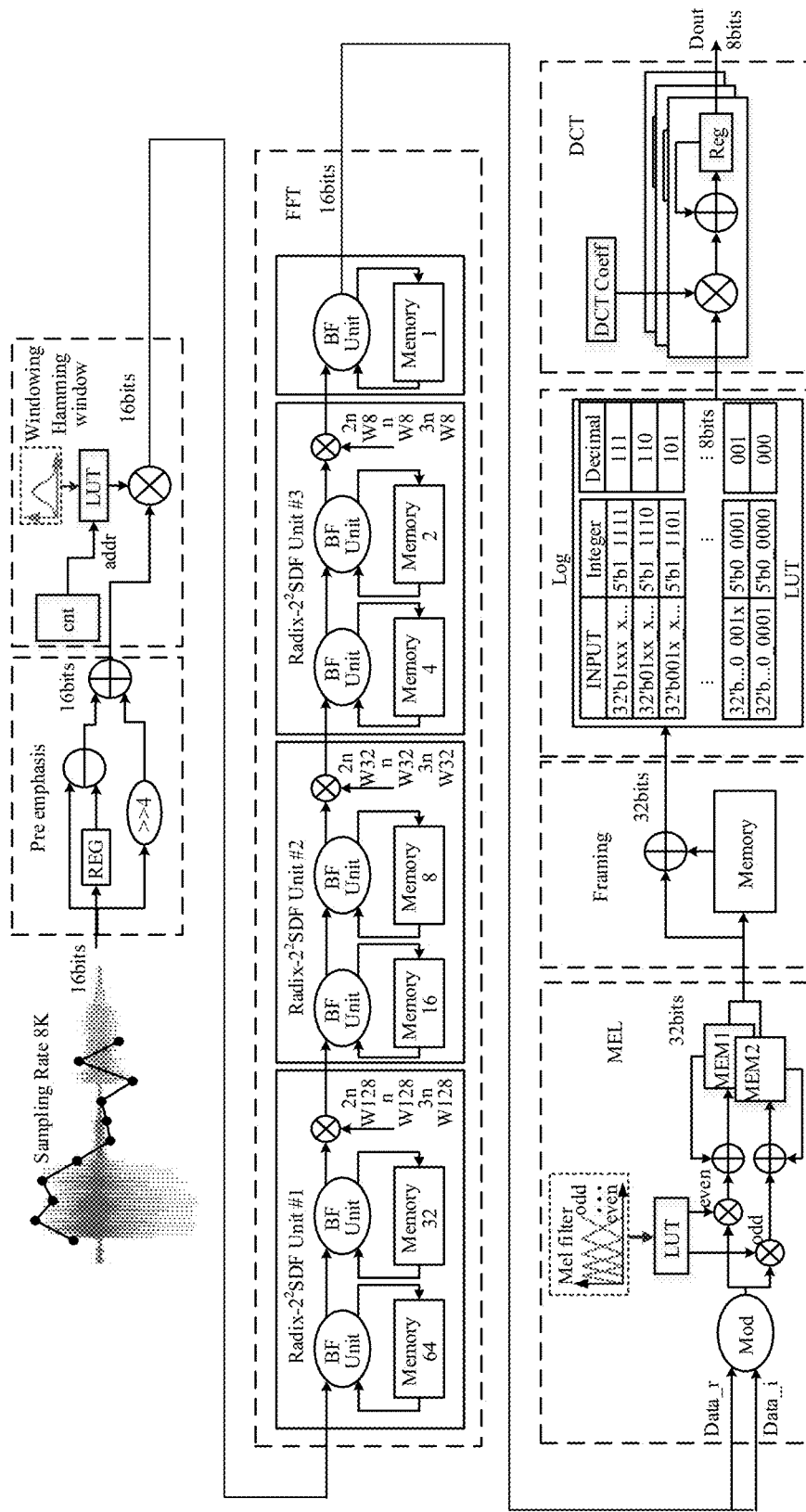
FIG. 1 is a system architecture diagram of a speech feature extraction circuit disclosed in the present invention.

As shown in FIG. 1, a low-power MFCC speech feature extraction circuit based on improved serial FFT designed in the present invention is mainly divided into seven modules: a pre-process module, a windowing module, an FFT module, a Mel filtering module, an adjacent frame merging module, a logarithm module and a DCT module. A clock signal is input into the circuit, a speech analog-to-digital converter (ADC) samples a data signal, and a speech feature value is output. The operation of the circuit may be divided into the following seven steps.

In step 1, starting from the boost of the circuit, a sampling end of the speech ADC samples audio at a sampling rate of 8K, the system firstly needs to use a register (REG) to cache adjacent previous sampled data, the data output of the register will serve as the input of the pre-process module, and after entering the pre-process module, current sampled data $data_{in}[k]$ is added with the previous sampled data $data_{in}[k-1]$ cached by the register and shifted data thereof to implement a pre-emphasis operation. The formula for the pre-emphasis operation is as follows:

$$data_{out}[k]=data_{in}[k]-data_{in}[k-1]+data_{in}[k-1]>>4,$$

where k starts with 1 and indicates the location of data.

Figure 2:
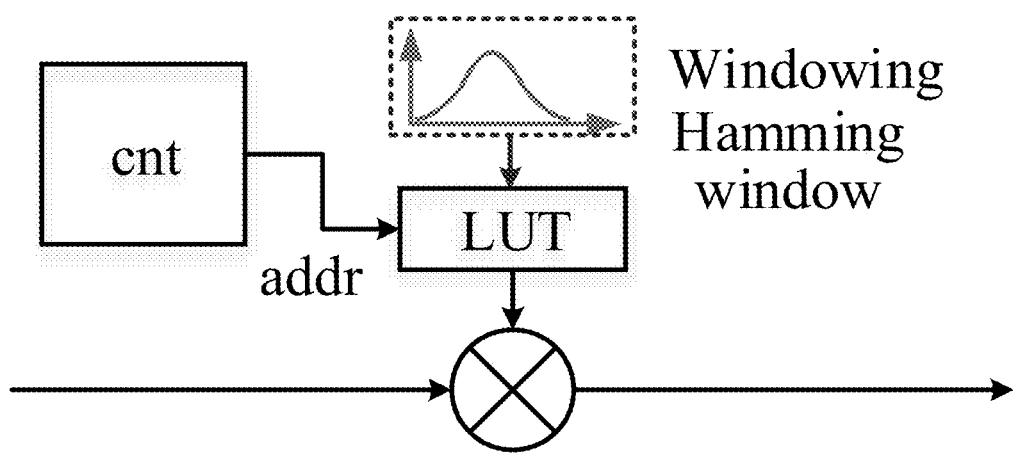
FIG. 2 is an architectural diagram of a windowing module of a speech feature extraction circuit disclosed in the present invention.

In step 2, the windowing module uses a memory to store 128 Hamming window coefficients, and the data flowing out of the pre-process module is sequentially multiplied by the stored Hamming window data in a cycle of 128 data and then output to the FFT module. The architecture of the windowing module is shown in FIG. 2, the Hamming window coefficients are obtained by reading an address lookup table of a counter, and pre-emphasized sampled data and the read Hamming window coefficients are formed and then sent to the FFT module.

Figure 3:
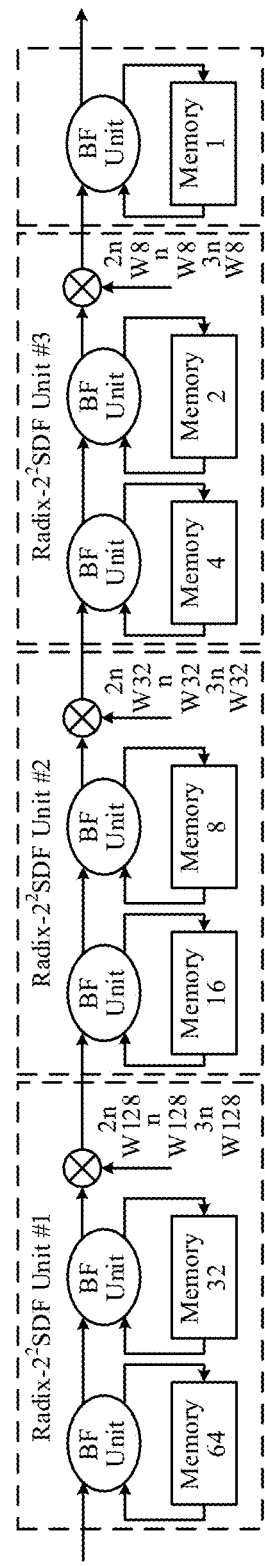
FIG. 3 is an architectural diagram of a serial FFT module of a speech feature extraction circuit disclosed in the present invention.

In step 3, a windowed data pipeline enters the FFT module. The architecture of the FFT module is shown in FIG. 3. Firstly, since the number of points of the Fast Fourier transform is 128, four stages of Radix-$2^2$SDF units are required, each Radix-$2^2$SDF unit includes a BF1 unit, a BF2 unit and a twiddle factor multiplication unit, the last Radix-$2^2$SDF unit includes only one BF1 unit, and the serial FFT module operation formula is as follows:

$$(k_1 + 2k_2 + 4k_3) = \sum_{n_3=0}^{\frac{N}{4}-1} \left\{ \left[ x(n_3) + (-1)^{k_1} x\left(\frac{N}{2} + n_3\right) \right] + (-j)^{(k_1+2k_2)} \left[ x\left(\frac{N}{4} + n_3\right) + (-1)^{k_1} x\left(\frac{3N}{4} + n_3\right) \right] \right\} W_N^{n_3(k_1+2k_2)} W_{\frac{N}{4}}^{n_3 k_3}.$$

In the above formula, $(k_1+2k_2+4k_3)$ represents the order of output signals, $k_1$ is an integer of 0 or 1, $k_2$ is an integer of 0 or 1, and $k_3$ is an integer of 0 to 63. The actual meaning of the formula inside a summation symbol in the right equation of the equal sign is a mathematical explanation of the butterfly operation. $x(n_3)+(-1)^{k_1}x(N/2+n_3)$ serves as BF1, $\{[x(n_3)+(-1)^{k_1}x(N/2+n_3)]+(-j)^{(k_1+2k_2)}[x(N/4+n_3)+(-1)^{k_1}x(3N/4+n_3)]\}$ serves as BF2, and $W_N^{n_3(k_1+2k_2)}$ is a twiddle factor. The data is subjected to four rounds of Radix-$2^2$SDF unit operations, and finally FFT results of a bit permutation order are sequentially output.

Figure 4:
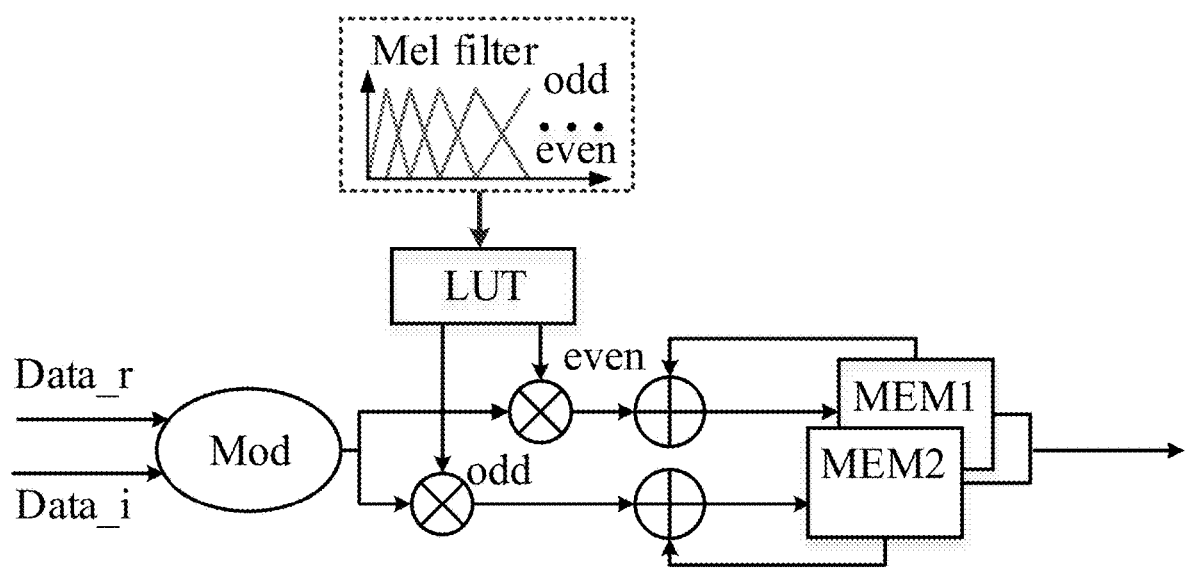
FIG. 4 is an architectural diagram of a Mel filtering module of a speech feature extraction circuit disclosed in the present invention.
Figure 5:
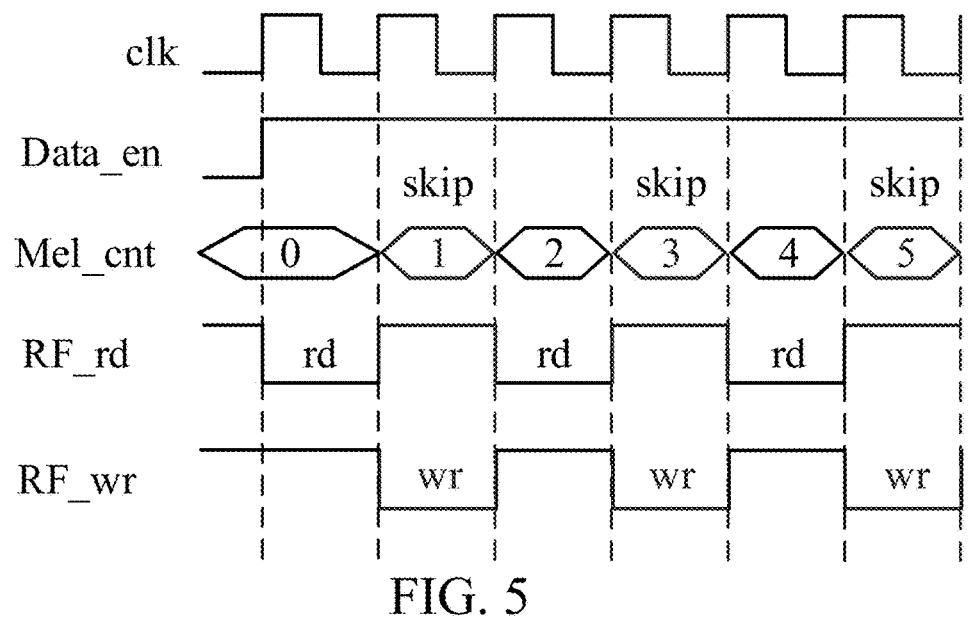
FIG. 5 is a Mel filtering read-write timing diagram of a speech feature extraction circuit disclosed in the present invention.

In step 4, a complex number output by FFT firstly squares and sums a real part and an imaginary part, an output modulus value selects only data with odd indexes (setting the index of the first data to be 1) to be multiplied by and accumulated with function values of a Mel filter stored in the memory, and a frame of 20-order Mel value is output finally. In the filtering process, a partial sum needs to be read out from a storage array, a modulus value corresponding to a current odd index is multiplied by a Mel coefficient, the read partial sum is accumulated, and an updated value of the accumulated partial sum is written into the storage array. Two clock cycles are needed in the process. Only an odd number of input data needs to be considered for filtering, so operation is not needed for an even number of input data. Therefore, the actual operation time is also two clock cycles, thereby ensuring the consistency of the circuit throughput rate. The architecture of the Mel filtering module is shown in FIG. 4, and the detailed timing diagram is shown in FIG. 5.

In step 5, the 20-order Mel value output by the Mel filtering module is stored in the memory of the adjacent frame merging module and added with a Mel value of a next frame, and the added result serves as a new Mel value of the next frame.

Figure 6:
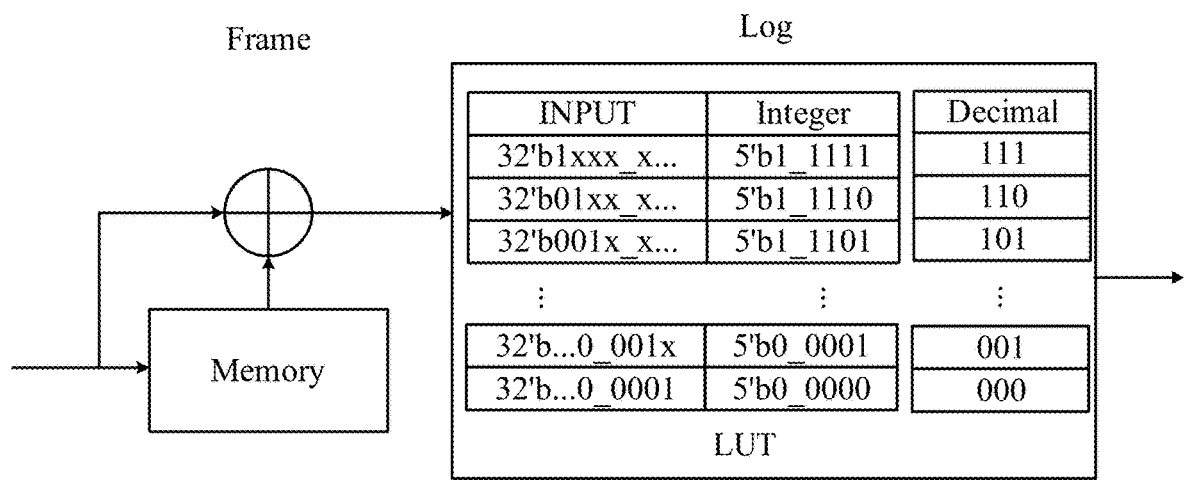
FIG. 6 is an architectural diagram of a framing logarithm module of a speech feature extraction circuit disclosed in the present invention.

In step 6, after the Mel value is output, the logarithm of the Mel value needs to be obtained, and a logarithm function is implemented in a lookup table manner by searching for a location where the highest bit '1' of the Mel value appears. Taking an eight-bit binary number 10001111 as an example, the location where the highest bit '1' of the Mel value appears is the 7$^{th}$ bit, so a corresponding logarithmic value is 7. The architecture of the adjacent frame merging module and the lookup table implementing the logarithm function is shown in FIG. 6.

In step 7, the logarithm-taken Mel value needs to be subjected to DCT, and the formula of DCT is as follows:

$$C(x) = \sum_{m=0}^{M-1} s(m)\cos\left(\frac{\pi x(m - 0.5)}{M}\right), x = 1, 2, \ldots, L.$$

s(m) is a Mel value, L is a DCT order, M is a Mel order, L is usually smaller than M, by the multiplication and accumulation of data and corresponding cosine values on hardware, a 10-order DCT value is output to serve as a feature value of an audio collection signal of a current frame.

Finally, the circuit of the present invention is simulated in the environment of TSMC28nmTT25° C. Compared with the conventional MFCC algorithm based on overlapping framing, the power consumption is reduced by 43%. The specific power consumption comparison table is shown in table 1.

TABLE 1

| Circuit type | Power consumption |
| --- | --- |
| Conventional MFCC algorithm hardware circuit | 275 nw |
| MFCC hardware circuit based on non-overlapping framing and serial FFT | 157 nw |

What is claimed is:

1. An ultra-low-power speech feature extraction circuit based on non-overlapping framing and serial fast Fourier transform (FFT), comprising:
    a windowing module, configured to window pre-emphasized data by taking t-millisecond data as a data length of a window, and output a data stream containing T data points frame by frame, T=2$^N$, N being a positive integer;
    an FFT module, configured to perform Fourier transform on a windowed data layer by layer through $$\frac{N}{2}$$

serial radix-2$^2$ single-path delay feedback (Radix-2$^2$SDF) units and then output bit-permuted complex data, wherein:
    an i$^{th}$ Radix-2$^2$SDF unit comprises: a first butterfly operation unit, a second butterfly operation unit, a multiplication unit multiplied by a twiddle factor, a memory of $$\frac{T}{2i} * A$$

bits wherein A is a bit-wise data precision value, and a memory of $$\frac{T}{2(i+1)} * A$$

bits, an input end of the first butterfly operation unit being connected to the windowed data or an operation result of a previous Radix-2$^2$SDF unit, an input end of the second butterfly operation unit being connected to an output end of the first butterfly operation unit, an input end of the multiplication unit being connected to an output end of the second butterfly operation unit, the multiplication unit outputting an operation result of the i$^{th}$ Radix-2$^2$SDF unit, the first butterfly operation unit calling the memory of $$\frac{T}{2i} * A$$

bits in the process of the first butterfly operation unit's operation, the second butterfly operation unit calling the memory of $$\frac{T}{2(i+1)} * A$$

bits in the process of the second butterfly operation unit's operation, $$1 \leq i \leq \frac{N}{2} - 1;$$

and
a $$\frac{N}{2}^{th} Radix\text{-}2^2 SDF$$

unit comprises only one butterfly operation unit and a memory of 2*A bits, the only butterfly operation unit performing a butterfly operation on an operation result of the previous Radix-2$^2$SDF unit and calling the memory of 2*A bits in the operation process;
    a Mel filtering module, configured to perform odd-even separation processing on an energy value of the data output by the FFT module;
    an adjacent frame merging module, comprising a register and an accumulator, and configured to accumulate a multi-order Mel value of a current frame and a multi-order Mel value of a previous frame, and output an updated multi-order Mel value of the current frame; and a logarithm module, configured to look up corresponding logarithm values by searching for a location where the highest bit '1' appears in input data and implement a logarithm operation in a lookup table manner.

2. The ultra-low-power speech feature extraction circuit based on non-overlapping framing and serial FFT according to claim 1, wherein the Mel filtering module comprises:

a mode selector, having an input end connected to the complex data output by the FFT module, and outputting an energy value of an odd time index or an even time index;

a multi-order Mel filtering module of an odd time point, having an input end connected to the energy value of the odd time index, reading a partial sum of the Mel value of the odd time index, and obtaining the multi-order Mel value of the current frame by accumulating the read partial sum after the energy value of the current odd time point is multiplied by a Mel coefficient; and a multi-order Mel filtering module of an even time point, having an input end connected to the energy value of the even time index, reading a partial sum of the Mel value of the even time index, and obtaining the multi-order Mel value of the current frame by accumulating the read partial sum after the energy value of the current even time point is multiplied by a Mel coefficient.

3. The ultra-low-power speech feature extraction circuit based on non-overlapping framing and serial FFT according to claim 2, wherein the register is configured to cache the multi-order Mel value of the current frame output by the Mel filtering module; and the accumulator has an input end connected to the multi-order Mel value of the current frame output by the Mel filtering module, reads the multi-order Mel value of the previous frame from a memory, updates the multi-order Mel value of the current frame after accumulation, and accumulates the multi-order Mel value of the current frame and the multi-order Mel value of the previous frame, and outputting the updated multi-order Mel value of the current frame.

4. The ultra-low-power speech feature extraction circuit based on non-overlapping framing and serial FFT according to claim 1, wherein the logarithm module takes a logarithm value with the base of 2 for the updated multi-order Mel value of the current frame and takes a logarithm value with the base of 2 for a Mel value in a lookup table manner, and performs DCT.

* * * * *